Figure 1:
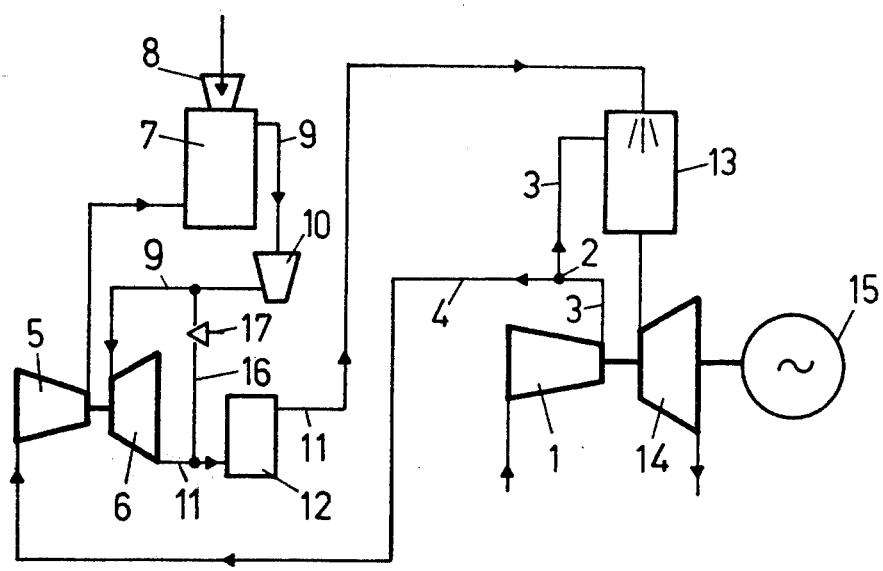

United States Patent [19]

Pfenninger

[11] 4,199,933
[45] Apr. 29, 1980

[54] POWER PLANT WITH PRESSURIZED-GAS GENERATOR

[75] Inventor: Hans Pfenninger, Baden, Switzerland

[73] Assignee: BBC Brown Boveri & Company Limited, Baden, Switzerland

[21] Appl. No.: 872,906

[22] Filed: Jan. 27, 1978

Related U.S. Application Data

[63] Continuation of Ser. No. 690,926, May 28, 1976, abandoned, which is a continuation-in-part of Ser. No. 531,110, Dec. 9, 1974, abandoned.

[30] Foreign Application Priority Data

Dec. 22, 1973 [CH] Switzerland .................. 18016/73

[51] Int. Cl.² .......................... F02B 43/08; F02C 3/22
[52] U.S. Cl. ............................. 60/39.12; 415/121 G
[58] Field of Search ............. 60/39.12, 39.09 P, 39.02; 415/121 G; 55/73, 452, 459 A, 459 B

[56] References Cited

U.S. PATENT DOCUMENTS

| 2,714,670 | 8/1955 | Linder et al. ............ 60/39.12 |
| 3,078,640 | 2/1963 | Milton ..................... 55/73 |
| 3,636,682 | 1/1972 | Rush ....................... 55/459 R |
| 3,704,587 | 12/1972 | Krieb et al. ............ 60/39.12 |

FOREIGN PATENT DOCUMENTS

| 628212 | 8/1949 | United Kingdom ............ 55/452 |
| 640104 | 7/1950 | United Kingdom ............ 415/121 G |
| 1146262 | 3/1969 | United Kingdom ............ 55/452 |

*Primary Examiner*—Louis J. Casaregola
*Attorney, Agent, or Firm*—Burns, Doane, Swecker & Mathis

[57] ABSTRACT

A power plant essentially comprises a thermal prime mover, a pressurized-gas generator for generating hot producer gas from coal, the producer gas following separation out of dust and sulphur content being utilized as fuel for the power plant. Included is a pressure-charging group consisting of coupled compressor and gas turbine units, the compressor serving to compress air and deliver it to the pressurized gas generator, and the gas turbine being driven by the hot pressurized and unburned producer gas. Two dry-state dust separators for dust entrained in the producer gas are arranged in series in the flow path of the producer gas after leaving the pressurized-gas generator. The first dust separator is a cyclone type which functions to remove coarser particles of the dust and the second separartor which is structurally integrated into the gas turbine to remove any dust particles still remaining in the producer gas is constituted by a volute casing located at the inlet end of the turbine which serves as a replacement for the normally used row of guide vanes and which functions to centrifuge out the dust into an annular duct through an entrance gap thereto formed in the outer wall of the turbine ahead of the first row of rotor blading thus to avoid any erosive action on the latter. A second similar annular duct for receiving centrifuged out dust particles can also be provided in the gas flow path immediately after the first row of rotor blading. The hot producer gas following expansion in passing through the turbine accompanied by a drop in temperature but without further cooling is then passed through a dry state porous mass which chemically binds and removes the sulphur content prior to delivery to a combustion chamber component wherein the prime mover is a further gas turbine driving a load such as electrical generator or to a boiler wherein the prime mover is a steam turbine.

6 Claims, 3 Drawing Figures

POWER PLANT WITH PRESSURIZED-GAS GENERATOR

This is a continuation of application Ser. No. 690,926 filed on May 28, 1976 (abandoned), which is a continuation-in-part of application Ser. No. 531,110 field Dec. 9, 1974 and now abandoned.

The present invention relates to an improved construction for a power plant which essentially comprises a thermal prime mover, a pressurised-gas generator for generating hot producer gas from coal, the producer gas following separation out of dust and sulphur content being utilized as fuel for the power plant. Included is a pressure-charging group consisting of coupled compressor and gas turbine units, the compressor serving to compress air and deliver it to the pressurised-gas generator, and the gas turbine being driven by the hot pressurised and unburned producer gas. Two dry-state dust separators for dust entrained in the producer gas are arranged in series in the flow path of the producer gas after leaving the pressurised-gas generator. The first dust separator is a cyclone type which functions to remove coarser particles of the dust and the second separator which is structurally integrated into the gas turbine to remove any dust particles still remaining in the producer gas is constituted by a volute casing located at the inlet end of the turbine which serves as a replacement for the normally used row of guide vanes and which functions to centrifuge out the dust into an annular duct through an entrance gap thereto formed in the outer wall of the turbine ahead of the first row of rotor blading thus to avoid any erosive action on the latter. A second similar annular duct for receiving centrifuged out dust particles can also be provided in the gas flow path immediately after the first row of rotor blading. The hot producer gas following expansion in passing through the turbine accompanied by a drop in temperature but without further cooling is then passed through a dry state porous mass which chemically binds and removes the sulphur content prior to delivery to a combustion chamber component wherein the prime mover is a further gas turbine driving a load such as electrical generator or to a boiler wherein the prime mover is a steam turbine.

When producer gas is produced under pressure from coal, the dimensions of the gas generator are only a fraction of one operating at atmospheric pressure. But gasification under pressure is of particular advantage if it is used in conjunction with a prime mover comprising a gas turbine or a steam turbine having a pressure-charged steam generator.

To provide the compressed air necessary for gasification under pressure it is customary to employ a charging group, the gas turbine of which is so regulated that it produces just the amount of power required for the compressor. The charging group is occasionally also used as a prime mover, in that surplus power is produced which then drives an electric generator. Although the producer gas no longer contains any slag, it nevertheless carries a substantial proportion of dust in the form of fly ash and coke particles, this mixture being termed dust in the following, which would give rise to severe, unacceptable erosion in any gas turbine connected downstream of the pressurised-gas generator. To avoid this, the dust must be removed from the producer gas before it reaches the gas turbine. This is usually done in a wet scrubber/cooler.

A wet scrubber/cooler of this kind, located before the gas turbine of the pressure-charging group, has recently become known in connection with Kellermann power plant in Lunen (journal "Brennstoff-Warme-Kraft" 23 (1971) 6 258-262). A disadvantage of this concept is that scrubbing of the producer gas is accompanied by a significant drop in temperature, the loss of sensible heat amounting to approximately 10% of the heat supplied by the coal. There is then no longer sufficient energy available for compressing the air, and the producer gas has to be reheated before entering the gas turbine so that it can provide the power necessary to drive the compressor.

The objects of the invention are to reduce the heat losses incurred when separating the dust and sulphur in a power plant incorporating a pressurised-gas generator, and to reduce any erosive effect on the turbine blading caused by dust particles entrained in the hot producer gas.

These objectives as previously stated, are achieved principally by utilizing two dry-state dust separators arranged in series in the flow path of the hot pressurised producer gas after leaving the gas generator, the first of these dust separators being of the cyclone type which functions to remove coarser particles of the entrained dust and the second separator being structurally integrated into the gas turbine which functions to remove by centrifugal action any remaining dust particles from the gas and thereby avoid any corrosive action on the turbine blading, these dust particles being directed into an annular duct formed in the outer wall of the turbine at the inlet end ahead of the first row of rotor blading and adjacent a volute section which produces the desired centrifuging action on the gas. A similar dust receiving annular duct arrangement following the first row of rotor blading may also be provided. The sulphur content in the producer gas is removed after leaving the gas turbine by passing it through a dry type porous mass which functions to chemically bind the sulphur.

Removing the dust by the dry method does not impair the energy content of the producer gas and the pressure-charging group is able to compress the air required for the pressurised-gas generator to the prescribed pressure. The dry sulphur-removal device is located in the process after the gas turbine of the pressure-charging group, and therefore no more than a relatively small quantity of heat is removed from the producer gas on passing through this device. Also, there is no longer any need to reheat the producer gas after sulphur removal, because the gas is then fed into a combustion chamber or a steam generator. This double saving of heat makes the overall process more economical.

Any dry-type collector, preferably of the centrifugal type, gives rise to a certain pressure loss. This can be avoided if the collector is integrated with the gas turbine of the pressure-charging group. The dust, together with a certain amount of entrained gas, can be drawn off through a gap in the outer bounding wall of the flow passage at a point where the flow has a circumferential component. This is particularly effective after the first moving row of the gas turbine, where use can be made not only of the initial rotational movement of the flow, but also of the centrifugal force applied to the dust by the rotor blading. The parts exposed to erosion, in particular, can be protected. After the dust has been removed the entrained gas can be returned to the process, so that virtually no producer gas is lost.

Examples of the invention are shown schematically in the drawings and are described more fully in the following. The drawings show:

FIG. 1—a power plant with a gas turbine as the prime mover

Figure 2:
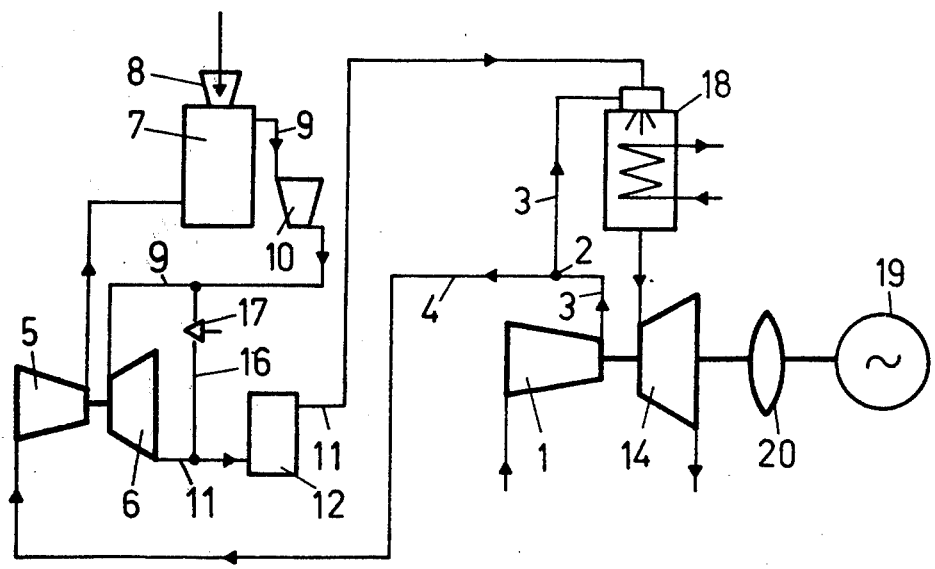

FIG. 2—part of a steam power plant with pressure-charged steam generator

Figure 3:
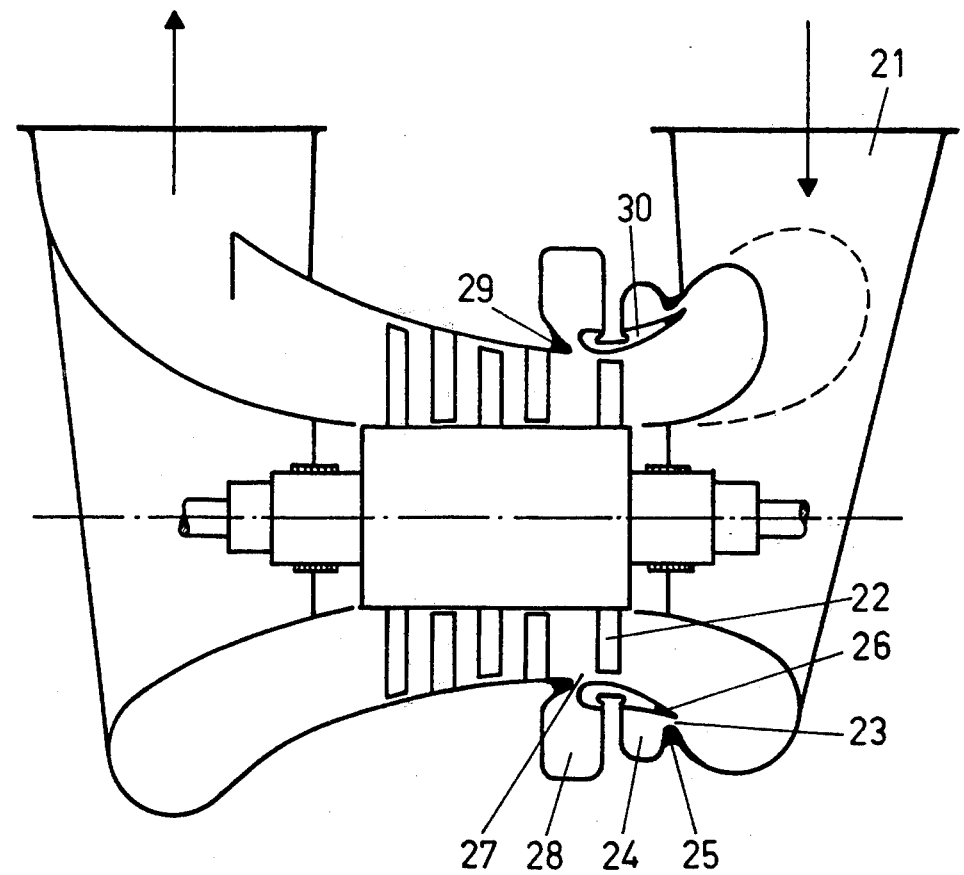

FIG. 3—an axial section through a gas turbine of a pressure-charging group.

As shown in FIG. 1, the air for gasifying the coal under pressure and the combustion air are both compressed by compressor 1 to 10 bar, for example. At point 2 of air line 3 a small proportion of the air is bled off and fed along line 4 to the pressure-charging group of the pressurised-gas generator 7, comprising compressor 5 and gas turbine 6. In compressor 5 this quantity of air is still further compressed and fed to the pressurised-gas generator 7, where it is used to gasify the coal introduced through trap 8. The producer gas passing from the pressurised-gas generator 7 into line 9 has a temperature of 400°–600° C. and a pressure of some 20 bar, and is fed to the gas turbine 6.

In order to avoid severe erosion in the gas turbine of the charging group, due to the dust entrained by the producer gas, line 9 incorporates a first dust collector 10, e.g. a van Tongeren collector, i.e. a dry type cyclone in which dust, particularly coarser particles, is removed from the producer gas.

Cooling of the gas and subsequent reheating, as has been necessary hitherto, is thus avoided. The dust collector must have an efficiency of at least 90%.

After passing through the gas turbine 6 the producer gas, without being cooled through a cooler or scrubber, is passed along line 11 to the dry type sulphur-removal device 12. The sulphur-free gas, and also the combustion gas from air line 3, is then fed into the combustion chamber 13 of the gas turbine 14, the latter driving the compressor 1 and the electric generator 15.

Since the producer gas still has a relatively high temperature even after the centrifugal dust collector 10, it would be possible for the gas turbine 6 not only to drive the compressor 5 of the charging group, but also to produce additional energy. However, it also is possible to dispense with the surplus energy and allow a large pressure drop in the pressurised-gas generator 7 and the sulphur-removal device 12.

Another possibility is shown in the drawing. A bypass 16 round the gas turbine 6 is located between lines 9 and 11, and controlled by valve 17. By passing a controlled quantity of producer gas through this bypass 16 it is possible to regulate the speed of the charging group and match the air flow rate for the pressurised-gas generator to the load at any given time.

FIG. 2 shows a part of a steam power plant which, within the limits of the diagram, is largely the same as the plant in FIG. 1, as is apparent from the corresponding reference numbers. Here, instead of the combustion chamber there is a pressure-charged steam generator 18 in which the producer gas is burned and the combustion gases are used to generate steam for the prime mover (not shown). The compressor 1 again provides the air for pressurised gasification of the coal and also the combustion air, and together with the gas turbine 14 forms the charging group for the steam generator. The charging group in this case also includes starter motor 19 and coupling 20.

The two power plants described above are designed thusly that dust is eliminated from the generator gas by means of centrifugal separators with the result that the generator gas is not cooled off by heat exchangers or scrubbers from the time when it leaves the gas generator up to its use in the combustion chamber or steam producer. This dry separation is very efficient and simple and it operates practically without any thermal losses.

The sulphur which is present in the gas in the form of hydrogen sulphide can be removed in the dry way by the use of natural limonites or synthetic masses which are obtained during the bauxite decomposition in the course of the production of aluminum.

The untreated producer gas contains up to 6 g of dust per kg of gas (=6000 ppm). Only a fraction of this quantity of dust would be sufficient to destroy the gas turbine of the charging group of the pressurised-gas generator within a short time.

Since the generator gas, upon leaving the centrifugal separator 10, will still not possess in most instances a sufficient purity to avoid definitely any erosions within the gas turbine due to the presence of some fine, dangerous dust, an additional dust separator is provided within the gas turbine proper. This separator is structurally integrated into the gas turbine and will now be described in detail by the use of FIG. 3.

By means of an inlet volute casing 21, which replaces the normally used first row of guide vanes and which gives to the gas the tangential spin required for its entry into the first row of rotor blading 22, practically all remaining dust particles will be centrifuged and conducted into an annular duct 24 through the gap 23 located in the gas flow path ahead of the first rotor blade row 22.

It will be expedient to protect the volute inlet casing 21 against erosion by the use of a hard lining. The removable part 30, and especially its leading edge 26 which projects slightly into the gas flow zone, are likewise provided with a hard metal shield. These erosion-proof linings consist of cobalt alloys, admixed with tungsten, chromium and carbon, known under the brand name "Stellit". The hard linings can be applied for example by a flame plasma spraying process.

The dust is removed from the annular duct 24 by the dragging gas. Hard metal is also applied at the surface 25 at the entrance gap 23. The separated fine dust can be removed in a fine-meshed sieve and the purified dragging gas can then be returned to the producer gas after leaving the gas turbine.

Since it is still possible that some very fine dust could remain even after this separating process, it may be advantageous to arrange a second annular duct 28 similar to duct 24 in back of the first row of rotor blading 22. Within the first row of rotor blading there is given to the remaining fine dust a great circumferential velocity by the rotation of the blades, and this dust is thus subjected to a great centrifugal force. This remaining dust is carried to the annular duct 28 through the gap 27, its leading edge 29 protruding slightly into the zone of gas flow so that the rotating dust layer will be stripped off.

It will be advantageous to keep the width of the gap narrow and to maintain within the adjacent annular ducts a pressure that is lower than the pressure within the gas flow duct, with the result that a suction effect is generated at the gaps, thereby improving the rate of separation by the dragging effect on the gas which is taken in with the remaining dust.

I claim:

1. A power plant comprising at least one thermal prime mover, a pressurised-gas generator for generating hot pressurised producer gas from coal, said pressurised producer gas after separation of dust and sulphur therefrom being utilized as the fuel for the power plant, and further comprising a pressure-charging group consisting of coupled compressor and gas turbine units, said compressor serving to compress air and deliver it to said pressurised-gas generator, and said gas turbine unit being driven by the hot pressurised and unburned producer gas from said pressurised-gas generator, two dry-state dust separators for dust entrained in the producer gas arranged in series in the flow path of the producer gas after leaving said pressurised-gas generator, the first of said dust separators being of the cyclone type which functions to remove the coarser of the dust particles entrained in the producer gas and the second said separator being structurally integrated into said gas turbine unit and which functions to remove any dust particles still remaining in the producer gas, said second dust separator being constituted by a volute casing at the inlet end of said gas turbine, said volute casing serving as a replacement for the normally used row of guide vanes and which functions to impart a spin to the entering gas which thereby effects centrifugal separation out of the dust particles thus to avoid any erosive action on the turbine rotor blading, an annular duct formed in the outer wall of said inlet end of said turbine ahead of the first row of rotor blading for receiving the centrifuged out dust particles through an entrance gap, said producer gas following expansion in passing through said gas turbine accompanied by a drop in temperature and without further cooling then being passed through a dry state porous mass which chemically binds and removes the sulphur content prior to delivery to the combustion chamber or boiler for the prime mover.

2. A power plant as defined in claim 1 and which further includes a second annular duct and entrance gap thereto formed in the outer wall of said gas turbine following the first row of rotor blading for separation out of any further dust particles which are not centrifuged out into the first mentioned annular duct.

3. A power plant as defined in claim 2 wherein edges of the entrance gaps into said annular ducts as viewed in the direction of the gas flow path project into the flow path thus guiding the dust particles being centrifuged out together with a minor amount of dragging gas into said annular ducts.

4. A power plant as defined in claim 2 wherein the entrance gaps into said annular ducts have a narrow width in comparison with an axial width of the annular ducts.

5. A power plant comprising:
compressor means for compressing air;
pressurized-gas generation means for generating unburned, hot pressurized producer gas from coal, said generation means receiving compressed air from said compressor means;
first gas turbine means for utilizing the unburned, hot pressurized producer gas from the generation means to drive the compressor means, said first gas turbine means having a volute casing at an inlet end of said first gas turbine means, the volute casing imparting a spin to the unburned, hot pressurized producer gas upon entry into the first gas turbine means to centrifugally separate dust particles from the producer gas, the dust particles and a portion of the unburned, hot pressurized producer gas passing through a first entrance gap into a first annular duct, the gap and the duct being formed in an outer wall of the inlet of the first gas turbine means;
a cyclone dust separator provided between said pressurized-gas generation means and said first gas turbine means to remove a portion of the dust particles from the unburned, hot pressurized producer gas;
dry-state sulphur removing means for chemically binding and removing sulphur from the producer gas downstream of the first gas turbine means, the sulphur removing means substantially maintaining the temperature and pressure of the producer gas during the sulphur removal;
combusting means for burning the producer gas from the dry-state sulphur removing means; and
second gas turbine means for utilizing the substantially sulphur free, burned producer gas to generate power.

6. The power plant of claim 5, wherein the first gas turbine means includes a second annular duct and a second entrance gap thereto formed in the outer wall of the inlet of the first turbine means to separate out additional dust particles from the unburned producer gas, the second gap being arranged downstream of the first row of blading of the first gas turbine means.

* * * * *